United States Patent [19]

Schlipf et al.

[11] Patent Number: 5,194,543

[45] Date of Patent: Mar. 16, 1993

[54] CROSSLINKABLE FLUORINE-CONTAINING COPOLYMERS, AND SURFACE COATINGS BASED ON THESE COPOLYMERS

[75] Inventors: Michael Schlipf, Burgkirchen; Gerhard Merten, Wiesbaden, both of Fed. Rep. of Germany

[73] Assignee: Hoechst Aktiengesellschaft, Frankfurt am Main, Fed. Rep. of Germany

[21] Appl. No.: 806,038

[22] Filed: Dec. 12, 1991

[30] Foreign Application Priority Data

Dec. 15, 1990 [DE] Fed. Rep. of Germany ....... 4040130

[51] Int. Cl.$^5$ ............................................. C08F 14/26
[52] U.S. Cl. ..................................... 526/255; 525/60; 428/522; 526/254
[58] Field of Search ....................... 526/254, 206, 255; 525/60; 428/522

[56] References Cited

U.S. PATENT DOCUMENTS 4,584,343  4/1986  Löhr et al. .......................... 525/60
4,668,749  5/1987  Graun et al. .
4,859,755  8/1989  Schlipf et al. .
4,985,519  1/1991  Koishi et al. .

FOREIGN PATENT DOCUMENTS 3415975 10/1985 Fed. Rep. of Germany ...... 526/254

OTHER PUBLICATIONS

Hackh's Chemical Dictionary by Julius Grant pp. 334 and 625.

*Primary Examiner*—Joseph L. Schofer
*Assistant Examiner*—N. Sarofim

[57] ABSTRACT

A crosslinkable, fluorine-containing copolymer is described which comprises a) from 10 to 60 mol-% of copolymerized units of a vinyl ester of a highly branched carboxylic acid whose acyl radical has 9 carbon atoms and comprises isomers containing two quaternary carbon atoms to which from 0 to 80 mol-% of isomers containing one quaternary carbon atom together with at least one tertiary carbon atom in the acyl radical are admixed, b) from 20 to 50 mol-% of copolymerized units of a vinyl ester of a short-chain carboxylic acid, where from 50 to 100% of the copolymerized units of this vinyl ester b) are in the OH form obtained by hydrolysis, and c) copolymerized units of a perfluoroolefin of the formula $$CF_2=CFR_f$$

in which $R_f$ is F or a perfluoroalkyl radical having 1 to 8 carbon atoms, in an amount which makes the sum of components a)+b)+c) up to 100 mol-%, but with the proviso that at least 10 mol-% of the perfluoroolefin are present in the copolymer.

The copolymers are suitable as binders for surface coating compositions of all types, in particular for industrial finishes.

7 Claims, No Drawings

CROSSLINKABLE FLUORINE-CONTAINING COPOLYMERS, AND SURFACE COATINGS BASED ON THESE COPOLYMERS

The invention relates to crosslinkable, fluorine-containing copolymers and to surface coating compositions based on these copolymers.

Fluorine-containing copolymers which give strongly adherent surface coatings, in particular for industrial finishes, when reacted with cold- or hot-curing crosslinking agents are generally known.

In particular, U.S. Pat. No. 4,584,343 discloses a surface coating system which is based on a fluorine-containing copolymer and which, in addition to a fluoroolefin, also contains units of a vinyl ester of a branched carboxylic acid which is resistant to hydrolysis, and units of a vinyl ester of a short-chain carboxylic acid which is susceptible to hydrolysis. The term "hydrolysis" in the context of this description is taken to mean both ester cleavage by hydrolysis and by alcoholysis. Hydrolysis converts the latter units into OH groups, and the products are formulated with suitable curing agents and conventional additives to give an industrially applicable surface coating system, in particular for coil coating. Such surface coating systems have a number of excellent properties, such as adhesion, surface hardness, gloss retention and weathering resistance. However, although these systems of conventional curing agents commence curing rapidly, they retain a certain residual tack for some time after application, which in turn gives rise to adherence of dust particles from the air and thus to soiling of the surface. The object was therefore to find copolymers which do not have this disadvantage.

To achieve this object, the present invention provides a crosslinkable, fluorine-containing copolymer which comprises a) from 10 to 60 mol-% of copolymerized units of a vinyl ester of the formula

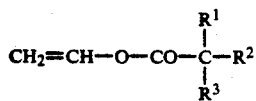

in which $R^1$, $R^2$ and $R^3$ are alkyl radicals and in which the entire acyl radical has 9 carbon atoms and comprises isomers containing two quaternary carbon atoms to which from 0 to 80 mol-% of isomers containing one quaternary carbon atom together with at least one tertiary carbon atom in the acyl radical have been admixed, b) from 20 to 50 mol-% of copolymerized units of a vinyl ester of the formula

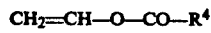

in which $R^4$ is a straight-chain alkyl radical having 1 to 3 carbon atoms and in which from 50 to 100% of the copolymerized units of this vinyl ester b) are in the OH form obtained by hydrolysis, and c) copolymerized units of a perfluoroolefin of the formula

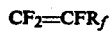

in which $R_f$ is F or a perfluoroalkyl radical having 1 to 8 carbon atoms, in an amount which makes the sum of components a)+b)+c) up to 100 mol-%, but with the proviso that at least 10 mol-% of the perfluoroolefin are present in the copolymer.

This is preferably a crosslinkable, fluorine-containing copolymer which comprises a) from 15 to 60 mol-% of copolymerized units of a vinyl ester of the formula

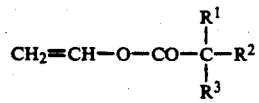

in which $R^1$, $R^2$ and $R^3$ are alkyl radicals and in which the entire acyl radical has 9 carbon atoms and comprises isomers containing two quaternary carbon atoms to which from 0 to 80 mol-% of isomers containing one quaternary carbon atom together with at least one tertiary carbon atom in the acyl radical have been admixed, b) from 15 to 45 mol-% of copolymerized units of a vinyl ester of the formula

in which $R^4$ is a straight-chain alkyl radical having 1 to 3 carbon atoms and in which from 50 to 100% of the copolymerized units of this vinyl ester b) are in the OH form obtained by hydrolysis, and c) copolymerized units of a perfluoroolefin of the formula

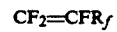

in which $R_f$ is F or a perfluoroalkyl radical having 1 to 8 carbon atoms, in an amount which makes the sum of components a)+b)+c) up to 100 mol-%, but with the proviso that at least 20 mol-% of the perfluoroolefin are present in the copolymer.

The component a) vinyl ester present in the copolymer according to the invention contains an acyl radical of the formula

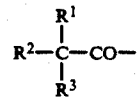

which has a total of 9 carbon atoms and, as a particular feature, contains a further quaternary carbon atom in addition to the quaternary carbon atom in the alpha-position to the CO group in the above formula. These isomers containing two quaternary carbon atoms may be present alone—in particular as a mixture—or contain from 0 to 80 mol-% of isomers which contain at least one tertiary carbon atom in addition to the quaternary carbon atoms arranged in the alpha-position to the CO group.

The acyl radical of this vinyl ester is preferably an isomer mixture containing, in addition to the isomers containing two quaternary carbon atoms, from 0.5 to 80 mol-% of isomers containing one quaternary and two tertiary carbon atoms in the same molecule or from 0.5 to 20 mol-% of isomers containing one quaternary and one tertiary carbon atom in the same molecule. It is also possible for all three of said species to be present, the proportions being selected so that they add up to 100.

Highly branched vinyl esters of this type are virtually completely resistant to hydrolysis.

The highly branched carboxylic acids based on these acyl radicals can be obtained by dimerization of isobutene and subsequent Koch reaction of these dimers with carbon monoxide and water. The corresponding vinyl esters can be obtained by transvinylation using vinyl acetate. However, they can also be obtained by Reppe synthesis by reacting the carboxylic acid with acetylene.

Suitable vinyl esters for component b) of the copolymer are those of the formula $$CH_2=CH-O-CO-R^4$$

in which $R^4$ is the methyl, ethyl or propyl radical. Vinyl acetate is preferred.

Component c) of the copolymer according to the invention is a perfluoroolefin of the formula $$CF_2=CFR_f$$

in which $R_f$ is F or a perfluoroalkyl radical having 1 to 8 carbon atoms. Examples which may be mentioned are perfluoro-1-butene, perfluoro-1-octene, perfluoro-1-hexene and perfluoroisobutene, preferably hexafluoropropylene and in particular tetrafluoroethylene, which is present in the abovementioned proportions, but whose proportion must not exceed 10 mol-%, preferably 20 mol-%.

The copolymers according to the invention are prepared by first copolymerizing the branched vinyl ester of component a), the vinyl ester of component b) and the perfluoroolefin of component c) and then converting from 50 to 100%, preferably from 50 to 80%, of component b) of the copolymer into the OH form by alkaline hydrolysis, in particular using lower alcohols.

The copolymerization is preferably carried out in an organic solvent which dissolves the copolymer formed. Solvents which are suitable for this purpose are, in particular, perfluorinated or fluorine- and chlorine-perhalogenated or partially halogenated solvents, such as, in particular, 1,1,2-trichlorotrifluoroethane, perfluorocyclobutane or 1,1,1-trifluoro-2-chloroethane. Also suitable are alkanols, such as tert.-butanol, carboxylic acid esters, such as, for example, butyl acetate or n-propyl acetate, or aliphatic or cycloaliphatic ketones such as, for example, methyl isobutyl ketone or cyclohexanone, and furthermore alkyl aromatic compounds, such as, for example, toluene or xylene, or mixtures of said solvents, and furthermore mixtures of said solvents with ethanol.

The copolymerization can also be directed towards colloidal dispersions by the emulsion polymerization process in the aqueous phase. To this end, emulsifiers in an amount of from 0.01 to 2% by weight, based on the initially introduced aqueous polymerization medium, must be added to the liquor. In principle, all nonionic or anionic emulsifiers which are suitable for the emulsion polymerization of perfluoroolefins and are customary to a person skilled in the art can be employed. Such emulsifiers are the ammonium and alkali metal salts of ω-hydrofluorocarboxylic acids, of perfluoroalkoxypropionic acids, in particular of perfluoropropoxypropionic acid, of perfluoroalkylsulfonic acids and perfluoroalkylphosphonic acids, and preferably of perfluorocarboxylic acids containing relatively long perfluoroalkyl chains, in particular those having 6 to 12 carbon atoms in the perfluoroalkyl radical. The abovementioned emulsifiers may also be employed in the form of their free acids and may, if desired, be neutralized using ammonia, it being possible to simultaneously adjust the pH by means of the acid:ammonia ratio. Nonfluorinated emulsifiers can also be employed, if desired.

Furthermore, buffer substances can be used, if desired, in the copolymerization. If premature hydrolysis of the vinyl ester of component b) is to be avoided, it is expedient to carry out the copolymerization at pH values in the acidic or at most slightly alkaline region, i.e. at pH values of from 3 to 8.

The copolymer according to the invention can also be prepared by the suspension polymeripition process. To this end, the pH is adjusted into the slightly acidic or slightly alkaline range required by adding suitable buffer substances, most of which simultaneously act as precipitants, such as, for example, borax. It may be expedient also to add a relatively small amount of the abovementioned emulsifiers during the suspension polymerization in order to avoid clumping and reactor deposits and to achieve a more uniform particle size of the copolymer. The amount by weight of such emulsifiers here is generally less than 150 ppm, preferably less than 50 ppm, based on the aqueous liquor.

The copolymerization of the said comonomers is initiated in the presence of initiators which form free radicals. Free radicals can be formed either using hard, high-energy irradiation or initiators which form free radicals and are soluble in the particular solvent or solvent mixture used, as are known in large number to a person skilled in the art for the copolymerization of perfluoroolefins. Such initiators are, in particular, peroxidic compounds. Mention may be made here, merely by way of example, of acyl peroxides, such as, for example, diacetyl peroxide, dipropionyl peroxide, dibutyryl peroxide, dibenzoyl peroxide, benzoyl acetyl peroxide, dilauroyl peroxide, disuccinyl peroxide and diglutaryl peroxide; peroxydicarbonates, such as, for example, di-2-ethylhexyl peroxydicarbonate, dicyclohexyl peroxydicarbonate, bis(4-tert.-butylcyclohexyl) peroxydicarbonate, dimyristyl peroxydicarbonate and dicetyl peroxydicarbonate; and furthermore cumyl perneodecanoate, tert.-butyl perneodecanoate, tert.-amyl perpivalate, tert.-butyl perpivalate, tert.-butyl per-2-ethylhexanoate, tert.-butyl permaleate, tert.-butyl perisononanoate, 2,5-dimethylhexane 2,5-diperbenzoate and tert.butylperbenzoate. Also suitable are perfluoroacyl peroxides and ω-hydrofluoroacyl peroxides. Another class of initiators which can be used is formed by water-soluble azo compounds.

Other compounds which may be mentioned for the copolymerization in the aqueous phase are water-soluble peracids, such as peracetic acid, and water-soluble salts thereof (in particular ammonium, sodium or potassium salts) or esters thereof, such as, for example, tert.-butyl peroxyacetate and tert.-butyl peroxypivalate. It is also possible to employ the water-soluble salts, in particular the ammonium, potassium and sodium salts, of other peracids, such as peroxomono- and peroxodisulfates, perphosphates, perborates or percarbonates. In particular in the low temperature range, the initiators employed may also be known redox systems, if desired with coactivators, which generate the free radicals to an adequate extent even at temperatures between 10° and 50° C. Of the redox systems known to a person skilled in the art for the polymerization of perfluoroolefins, mention may be made, merely by way of example, of the combinations of water-soluble peroxidic compounds, preferably peroxodisulfates, with hydrogen sulfite or disulfite or adduction products thereof with formaldehyde (Rongalit ®), with thiosulfate and with diimine-liberating compounds, such as, for example, with hydrazine or azodicarbonamide.

The total amount of initiator may be added to the polymerization liquor at the beginning of the reaction, but it may be expedient to introduce the total amount of initiator continuously over the course of the polymerization. It is likewise possible to introduce some of the initiator at the beginning and the remainder in one or more portions subsequently.

It is also advantageous to add suitable chain-transfer agents having a regulating action in the copolymerization, both in the case of copolymerization in organic solvents and in the case of copolymerization by the emulsion or suspension process in an aqueous medium. Suitable chain-transfer agents are aliphatic alcohols or ether alcohols having a short chain, aliphatic carboxylic acid esters or ketones, dialkyl glycols, mercaptans and furthermore also saturated aliphatic halogenated hydrocarbons which contain, as halogen, fluorine, chlorine and/or bromine and possibly also hydrogen. Examples of such halogenated hydrocarbons which may be mentioned are tetrachloroethane, trichloroethane, tetrafluorodibromoethane and, in particular, chloroform, methylene chloride and tetrachloromethane. The chain-transfer agent is usually added at the beginning of the polymerization, but it is also possible to separate off a portion and to meter it in later during the process.

The copolymerization is carried out at temperatures of from 0° to 100° C., preferably from 35° to 85° C., this temperature depending in detail, in particular, on the type of initiator employed. The perfluoroolefin is added under pressure during the copolymerization, and this pressure is then maintained. It can be in the range from values slightly below atmospheric pressure to about 40 bar; a pressure of from 5 to 25 bar is preferably maintained. To terminate the polymerization, the perfluoroolefin addition is interrupted and the end of the reaction awaited.

From about 5 to 60% by weight of the theoretically necessary amount of vinyl esters of component a) and of component b) are preferably introduced into the polymerization reactor at the beginning of the copolymerization and the remainder is then metered in with the perfluoroolefin during the copolymerization. However, it is also possible to introduce only some of the vinyl ester of component a) at the beginning and to add the remainder of its theoretically necessary amount together with the total amount of vinyl ester of component b) and of perfluoroolefin subsequently. Finally, it is also possible to begin the polymerization with the simultaneous introduction of all components (it also being possible for one or more to be premixed) and to continue this introduction constantly during the process.

Depending on the type of process selected for the copolymerization, the copolymer is obtained in the form of a clear, low-viscosity solution, a granular powder or an aqueous, colloidal dispersion. The latter is first precipitated by adding suitable coagulants or by introducing high shear forces.

The resultant copolymer according to the invention is subsequently subjected to aftertreatment in order to hydrolyze the units of the vinyl ester of component b). To this end, the pulverulent copolymer may first be dissolved in an alkanol having 1 to 4 carbon atoms and then precipitated using water. Alternatively, the hydrolysis can be accomplished using aqueous alkalis or quaternary ammonium hydroxides.

Copolymers in solution are expediently worked up using a process in which
a) first the majority of the solvent is removed by distillation under atmospheric pressure,
b) the residual monomers are then removed by vacuum distillation with forced conveying of the highly viscous copolymer,
c) this highly viscous copolymer is dissolved in a mixture of an alkanol having 1 to 4 carbon atoms and a solvent, this mixture should also be capable of dissolving the hydrolyzed product to give a homogeneous solution, and
d) the hydrolysis is carried out with addition of an alkaline agent, the solvent from c) is, if desired, removed by distillation, and the highly viscous copolymer which remains is dissolved in a surface coating solvent, and
e) the resultant copolymer solution is subjected to filtration.

Using said process, it is possible to convert from 50 to 100%, preferably from 50 to 80%, of the units of the vinyl ester of component b) into OH groups.

The copolymers according to the invention obtained in this way are readily soluble in a wide range of organic solvents, in particular in solvents and solvent mixtures which are conventionally used in the surface coatings industry.

Solvents of this type are selected, in particular, from the following groups: aliphatic alcohols having 1 to 8 carbon atoms, in particular having 4 to 8 carbon atoms; polyglycols, such as ethylene diglycol, ethylene triglycol, propylene diglycol and propylene triglycol; monoethers and diethers of such glycols, such as, for example, ethylene glycol monoethyl ether, ethylene glycol diethyl ether, ethylene glycol monobutyl ether, ethylene glycol dibutyl ether and propylene glycol monomethyl ether; glycol esters or glycol ether esters, such as, for example, ethylene glycol acetate, ethylene glycol acetate ethyl ether or propylene glycol acetate ethyl ether or methyl ether; furthermore alkylated and dialkylated aromatic compounds, such as, for example, xylene and diethyl benzene, and isomer mixtures of alkylated aromatic compounds, as marketed under the trade names ®Solvesso or ®Shellsol; ketones, such as, for example, methyl isobutyl ketone, cyclohexanone and isophorone; carboxylic acid esters, in particular esters of acetic acid and propionic acid with alcohols having 1 to 6 carbon atoms; and finally all mixtures of these solvents so long as they are homogeneously miscible with one another. The mixing ratio of dissolved copolymers to solvent may be from 95:5 to 5:95, preferably from 90:10 to 10:90; it is also possible to prepare surface coating systems containing high proportions of binding resin ("high solids").

The copolymers according to the invention contain OH groups, which enable chemical curing of the surface coating after application. Depending on the choice of crosslinking mechanism, the curing can be carried out at temperatures between 10° and 300° C., preferably between 15° and 250° C.

If the copolymers according to the invention are to be used for the production of a thermocurable surface coating, it is possible to add various curing agents, for example aminoplastic resins, such as melamine resins and urea resins, or polybasic acids and anhydrides and blocked polyisocyanates, these mixtures representing single-component coating systems.

These give coatings which have excellent flow properties and give particularly elastic, adherent, corrosion- and weathering-stable, in particular water-resistant primer coats, top coats and one-coat finishes. Curing of these modified surface coatings in the form of one-component coating systems requires baking temperatures of at least 80° C. The crosslinking reaction can be accelerated by adding an acid catalyst, such as, for example, p-toluene-sulfonic acid or salts thereof.

Typical examples of aminoplastic resins are products of condensation of compounds carrying amino groups, such as, for example, melamine, urea, acetoguanamine or benzoguanamine, and aldehydes, such as, for example, formaldehyde, paraformaldehyde, acetaldehyde or glyoxal, and products obtained by etherifying these condensation products using alcohols. Preference is given here to $C_1$- to $C_4$-alcohols. Specific examples which may be mentioned are: hexamethyletherified methylolmelamine, hexabutyl-etherified methylolmelamine, methylbutyl-etherified methylolmelamine, methyl-etherified methylolmelamine, butyl-etherified methylolmelamine and isobutyl-etherified methylolmelamine. From the point of view of compatibility with the copolymers according to the invention, preference is given to methyl-etherified methylolmelamines and in particular to penta-bis-hexamethyl-etherified methylolmelamines.

Typical examples of polybasic acids are acrylic resins containing at least two carboxyl groups per molecule, polyester resins containing at least two carboxyl groups per molecule and aromatic polybasic acids, such as, for example, trimellitic acid and pyromellitic acid.

Typical examples of polybasic acid anhydrides are succinic anhydride, trimellitic anhydride, pyromellitic anhydride and vinyl polymers containing carboxylic anhydride groups.

Typical examples of block polyisocyantes are obtained if the polyisocyanates known from polyurethane chemistry are protected using conventional blocking agents, such as, for example, alcohols, compounds containing phenolic OH groups, oximes, lactams, ethyl acetoacetates and N-monosubstituted carboxamides.

If, on the other hand, the copolymer is used to produce a surface coating in which curing is to take place even at room temperature, the crosslinking agent used is a non-blocked polyisocyanate. In this application, the curing agent is admixed separately before use, and a two-component coating system is used.

Typical examples of polyisocyantes are aliphatic diisocyanates, such as hexamethylene diisocyanate, trimethylhexamethylene diisocyanate and tetramethylene diisocyanate; alicyclic diisocyanates, such as xylene diisocyanate, methylcyclohexane 2,4- or 2,6-diisocyanate, isophorone diisocyanate and 4,4'-methylenebiscyclohexyl diisocyanate, polyisocyanates containing a biuret branch obtained by reacting said polyisocyanates with water; and polyisocyanates containing an isocyanurate ring obtained by polymerizing said diisocyanates.

The isocyanate addition reaction is accelerated by numerous catalysts, of which those having electron donor (Lewis bases) or acceptor properties (Lewis acids) are the most important. Tertiary amines, such as, for example, triethylamine, diethylethanolamine, dimethylethanolamine, 1,4-diazabicyclo[2.2.2]octane and cyclohexyldimethylamine, are effective Lewis bases. 4-Dimethylaminopyridine, which is known as an acylation catalyst, also catalyzes the isocyanate reaction.

Of catalytically effective Lewis acids, the tin compounds are the most important. Thus, tin(IV) compounds, such as, for example, dibutyltin dilaurate and diacetate, or tin(II) compounds, such as tin dioctanoate, are employed as very effective catalysts.

Finally, crosslinking using epoxy resins is also possible and is likewise carried out at elevated temperature using catalysts, in particular lithium salts or quaternary ammonium salts.

Surface coating systems can be formulated using all pigments and extenders customary in the surface coatings industry, in particular titanium dioxide, iron oxides, but also cadmium sulfide, zinc sulfide, lead white, barium sulfate, pyrogenic silica, Bentone and chalk, and also phthalocyanine dyes. The pigment content binder (i.e. copolymer according to the invention): pigment is in the range of from 1:0.2 to 1:3.0 by weight.

Furthermore, additives which are conventional for surface coating recipes of this type, such as, for example, flow-control agents, dispersants, wetting agents, UV absorbers and assistants, may be present to improve gloss or adhesion. However, it is also possible, if desired, to add flatting agents.

A very wide variety of conventional equipment for the production of surface coatings, for example ball mills, surface coating shakers, sand mills, jet mills, three-roll mills, kneaders and dissolvers, can be employed in the process for mixing the copolymer with the solvent, the pigment and other additives.

The surface coating systems formulated with addition of said crosslinking agents give coatings which can be applied to a very wide variety of substrates and, depending on the crosslinking component, can be cured at room temperature or baked at elevated temperatures. Substrates for this purpose are, in particular, metals, such as, for example, iron, steel, aluminum, copper, bronze and brass, or other hard surfaces, such as glass, ceramic, concrete, wood or plastic surfaces. If desired, the substrate can be mechanically pretreated. It may be expedient for substrate material with low adhesion to be coated in advance with a primer.

Application can be accomplished using all conventional methods, such as spraying, knife coating, brushing, rolling, dipping, flooding, rolling or spread coating. The surface coating systems formulated on the basis of the copolymers according to the invention are particularly suitable for cold-curing coatings on objects which are exposed to weathering. In addition, these surface coating systems are also suitable for industrial baked finishes, in particular by the coil coating process.

The surface coating systems formulated on the basis of the copolymers according to the invention have the surprising advantage of greatly reduced dust-dry and tack-dry times, i.e. even the residual tack of the coating completely disappears in a very short time, so that dust and dirt particles from the atmosphere no longer adhere. This is very desirable not only for esthetic reasons, but also for reasons of weathering resistance, since foreign bodies included in the surface always represent a point of attack for damaging weathering influences.

In addition, the surface coating systems formulated according to the invention also have the properties of known surface coating systems based on fluorinated copolymers at least to the same extent, such as, for example, high gloss, anti-adhesion properties and high pigment wetting power, which in turn means high covering power, even when applied in thin coatings.

The invention is illustrated by the examples below:

EXAMPLE 1

20 l of 1,1,2-trichloro-1,2,2-trifluoroethane are introduced into a 40 l polymerization reactor. The temperature of the introduced medium is adjusted to 20° C., and the reactor is then freed from oxygen in a conventional manner by repeated flushing with nitrogen. The liquor is saturated with tetrafluoroethylene (TFE) by twice injecting TFE to an excess pressure of 1.6 bar. The medium is heated to 75° C., and TFE is injected to a pressure of 9 bar with stirring. 560 g of vinyl acetate and 1180 g of a vinyl ester of a highly branched carboxylic acid containing an acyl radical having 9 carbon atoms (the acyl radical containing an isomer mixture containing 28 mol-% of carbon chains containing two quaternary carbon atoms, 68 mol-% of carbon chains containing one quaternary and two tertiary carbon atoms and 4 mol-% of carbon chains containing one quaternary and one tertiary carbon atom) are added, and the polymerization pressure is adjusted to 10 bar by further injection of TFE. The polymerization is initiated by adding 8 g of bis(4-tert.-butylcyclohexyl) peroxydicarbonate, which is previously dissolved in 1,1,2-trichloro-1,2,2-trifluoroethane. During the polymerization, a further bis(4-tert.-butylcyclohexyl) peroxydicarbonate is added in an amount precisely sufficient to keep the polymerization rate constant. The pressure in the reactor is kept at 10 bar by subsequent introduction of TFE, and further monomers, vinyl acetate and the highly branched vinyl ester are added in accordance with the consumption of TFE. The subsequent addition is carried out continuously and is complete after 2 hours. In total, 1500 g of TFE, 2360 g of the abovementioned highly branched vinyl ester and 1120 g of vinyl acetate are added. The total consumption of initiator is 36 g.

The polymerization is complete three-quarters of an hour after the end of the addition of monomer and initiator, after the pressure in the polymerization reactor has dropped to 9.1 bar. A clear copolymer solution having a solids content of 17% is obtained. The residual monomer content is 1.9% of highly branched vinyl ester and 1.0% of vinyl acetate. In order to remove polymerization liquor and residual monomers, the product solution is distilled. The polymer obtained in this way is colorless to slightly yellowish and contains 37 mol-% of TFE units, 31 mol-% of copolymerized units of the abovementioned highly branched vinyl ester and 32 mol-% of copolymerized units of vinyl acetate. For hydrolysis, the copolymer is dissolved in a mixture of 1,1,2-trichloro-1,2,2-trifluoroethane and methanol where each kg of the copolymer requires 1600 ml of the chlorofluoro carbon and 550 ml of methanol. 10 mol-% of NaOH, based on the vinyl acetate content of the copolymer, are added, and hydrolysis is carried out at room temperature for 5 hours with constant stirring. The degree of hydrolysis is monitored by IR spectroscopy by measuring the OH band at 3500 cm$^{-1}$. After the reaction, the reaction solution is adjusted to a pH of from 6 to 7 by adding acetic acid. The solvent mixture required for the hydrolysis is separated off using a thin film evaporator, and the product is dissolved in the appropriate surface coating solvent. Salts present as impurities, such as, for example, sodium acetate, are removed by subsequent pressure filtration, giving a clear, colorless to slightly yellowish product which has an OH number of 115 (degree of hydrolysis 70%), an intrinsic viscosity $\eta$, measured at 25° C. in tetrahydrofuran, of 0.22 dl/g and a molecular weight $\overline{M}_{rel}$, determined by gel permeation chromatography (GPC) in tetrahydrofuran relative to polystyrene standards, of 54,300.

The product is readily soluble in butyl acetate, xylene, a 2:1 xylene/methyl isobutyl ketone mixture, in propylene glycol monomethyl ether and in propylene glycol acetate monomethyl ether. The viscosity determination of the 50% strength by weight solutions was carried out, as customary in surface coatings, in accordance with DIN 53 211 using a 4 mm flow cup and gave values between 13 and 70 seconds, depending on the solvent and the temperature.

EXAMPLES 2 to 8

The copolymerization is carried out in accordance with the reaction conditions of Example 1, with the amounts of monomer employed shown in Table 1. Table 1 also shows the composition of the resultant copolymers and the most important resin properties (after hydrolysis as in Example 1):

TABLE 1

| | Example No. | | | | | | |
|---|---|---|---|---|---|---|---|
| | 2 | 3 | 4 | 5 | 6 | 7 | 8 |
| Monomers employed (g) | | | | | | | |
| TFE | 2750 | 1500 | 1500 | 1500 | 1750 | 1750 | 1750 |
| Highly branched vinyl ester (as defined in Example 1) | 4310 | 2360 | 2360 | 2360 | 2000 | 2200 | 2000 |
| Vinyl acetate | 2050 | 660 | 800 | 950 | 1100 | 1000 | — |
| Vinyl n-porpionate | — | — | — | — | — | — | 1280 |
| Copolymer composition (mol-%) | | | | | | | |
| TFE | 37 | 43 | 42 | 40 | 42 | 43 | 42 |
| Highly branched vinyl ester | 31 | 36 | 33 | 31 | 26 | 29 | 27 |
| Vinyl acetate | 32 | 21 | 25 | 29 | 32 | 28 | — |
| Vinyl n-propionate | — | — | — | — | — | — | 31 |
| OH number | 116 | 70 | 87 | 105 | 132 | 103 | 130 |
| Degree of hydrolysis (%) | 70 | 69 | 72 | 73 | 79 | 71 | 80 |
| Intrinsic viscosity $\eta$ (dl/g) | 0.22 | 0.26 | 0.23 | 0.22 | 0.20 | 0.20 | 0.21 |
| $\overline{M}_{rel}$ | 54,000 | 61,000 | 58,000 | 56,000 | 50,000 | 52,000 | 52,000 |

EXAMPLE 9

The polymerization and work-up are carried out as in Example 1, but the initiator used is dilauroyl peroxide and the reaction temperature chosen is 80° C. If 80 g of lauroyl peroxide are used, the reaction is complete after 3 hours and 30 minutes. After hydrolysis, which is carried out as in Example 1, the product has an OH number of 119 (degree of hydrolysis 72%), an intrinsic viscosity $\eta$, measured at 25° C. in tetrahydrofuran, of 0.13 dl/g, and a molecular weight $\overline{M}_{rel}$, and determined by gel permeation chromatography (GPC) in tetrahydrofuran relative to a polystyrene standard, of 39,000.

EXAMPLE 10

The polymerization and work-up are carried out as in Example 1, but the initiator used is azabisisobutyronitrile and the reaction temperature chosen is 90° C. If 85 g of azobisisobutyrolnitrile are used, the reaction is complete after 4 hours and 50 minutes. After hydrolysis, which is carried out as in Example 1, the product has an OH number of 110 (degree of hydrolysis 67%), an intrinsic viscosity $\eta$, measured at 25° C. in tetrahydrofuran, of 0.10 dl/g, and a molecular weight $\overline{M}_{rel}$ of 22,026.

EXAMPLE 11

16 l of 1,1,2-trichloro-1,2,2-trifluoroethane and 4 l of xylene are introduced into a 40 l polymerization reactor. The temperature of the introduced medium is adjusted to 20° C., and the reactor is then freed from oxygen in the conventional manner by repeated flushing with nitrogen. The liquor is saturated with TFE by twice injecting TFE to an excess pressure of 1.6 bar. The medium is heated to 75° C., and TFE is injected to a pressure of 9 bar with stirring. 400 g of vinyl acetate and 1180 g of the highly branched vinyl ester from Example 1 are added, and the polymerization pressure is adjusted to 10 bar by further injection of TFE. Polymerization is initiated by adding 8 g of bis(4-tert.-butylcyclohexyl) peroxydicarbonate, which is previously dissolved in 1,1,2-trichloro-1,2,2-trichloroethane. Further bis(4-tert.-butylcyclohexyl) peroxydicarbonate is added during the polymerization in an amount precisely sufficient to keep the polymerization rate constant. The pressure in the reactor is kept at 10 bar by subsequent addition of TFE, and further monomers, vinyl acetate and the highly branched vinyl ester are added in accordance with the consumption of TFE. The subsequent addition is carried out continuously and is complete after 3 hours. In total, 1500 g of TFE, 2360 g of the highly branched vinyl ester from Example 1 and 800 g of vinyl acetate are added. The total consumption of initiator is 72 g.

The polymerization is complete three-quarters of an hour after completion of the addition of monomer and initiator, after the pressure in the polymerization reactor has dropped to 9.0 bar, giving a clear copolymer solution having a solids content of 17%. The residual monomer content is 1.5% of highly branched vinyl ester and 0.8% of vinyl acetate. In order to remove the polymerization liquor and residual monomers, the product solution is distilled. The polymer obtained in this way is colorless to slightly yellowish and contains 42 mol-% of TFE units, 33 mol-% of copolymerized units of highly branched vinyl ester from Example 1 and 25 mol-% of copolymerized units of vinyl acetate. After hydrolysis, which is carried out as in Example 1, it has an OH number of 87 (degree of hydrolysis 72%), an intrinsic viscosity $\eta$, measured at 25° C. in tetrahydrofuran, of 0.09 dl/g and a molecular weight $\overline{M}_{rel}$, determined by gel permeation chromatography (GPC) in tetrahydrofuran relative to a polystyrene standard, of 20,500.

The product is readily soluble in butyl acetate, xylene, in a 2:1 xylene/methyl isobutyl ketone mixture, in propylene glycol monomethyl ether and in propylene glycol acetate monomethyl ether. The viscosity determination of the 50% strength by weight solutions was carried out, as customary in surface coatings, in accordance with DIN 53 211 using a 4 mm flow cup and gave values between 7 and 45 seconds, depending on the solvent and the temperature.

EXAMPLE 12

20 l of xylene are introduced into a 40 l polymerization reactor. The temperature of the introduced medium is adjusted to 20° C., and the reactor is then freed from oxygen in the conventional manner by repeated flushing with nitrogen. The liquor is saturated with TFE by twice injecting TFE to an excess pressure of 1.6 bar. The medium is heated to 75° C., and TFE is injected to a pressure of 9 bar with stirring. 560 g of vinyl acetate and 1180 g of the highly branched vinyl ester from Example 1 are added, and the polymerization pressure is adjusted to 10 bar by further injection of TFE. Polymerization is initiated by adding 12 g of bis(4-tert.-butylcyclohexyl) peroxydicarbonate, which is previously dissolved in xylene. Further bis(4-tert.-butylcyclohexyl) peroxydicarbonate is added during the polymerization in an amount precisely sufficient to keep the polymerization rate constant. The pressure in the reactor is kept at 10 bar by subsequent addition of TFE, and further monomers, vinyl acetate and the highly branched vinyl ester are added in accordance with the consumption of TFE. The subsequent addition is carried out continuously and is complete after 4 hours. In total, 1500 g of TFE, 2360 g of the highly branched vinyl ester from Example 1 and 1120 g of vinyl acetate are added. The total consumption of initiator is 300 g.

The polymerization is complete three-quarters of an hour after completion of the addition of monomer and initiator, after the pressure in the polymerization reactor has dropped to 9.2 bar, giving a clear copolymer solution having a solids content of 17%. The residual monomer content is 2.6% of highly branched vinyl ester and 1.8% of vinyl acetate. In order to remove the polymerization liquor and residual monomers, the product solution is distilled. The polymer obtained in this way is colorless to slightly yellowish and contains 37 mol-% of TFE units, 31 mol-% of copolymerized units of highly branched vinyl ester from Example 1 and 32 mol-% of copolymerized units of vinyl acetate. After hydrolysis, which is carried out as in Example 1, it has an OH number of 89 (degree of hydrolysis 54%), an intrinsic viscosity $\eta$, measured at 25° C. in tetrahydrofuran, of 0.027 dl/g and a molecular weight $\overline{M}_{rel}$, determined by gel permeation chromatography (GPC) in tetrahydrofuran relative to a polystyrene standard, of 3,640.

The product is readily soluble in butyl acetate, xylene, in a 2:1 xylene/methyl isobutyl ketone mixture, in propylene glycol monomethyl ether and in propylene glycol acetate monomethyl ether. The viscosity determination of the 50% strength by weight solution was carried out, as customary in surface coatings, in accordance with DIN 53 211 using a 4 mm flow cup and gave values between 6 and 39 seconds, depending on the solvent and the temperature.

EXAMPLE 13

17 l of xylene and 3 l of ethanol are introduced into a 40 l polymerization reactor. The temperature of the introduced medium is adjusted to 20° C., and the reactor is then freed from oxygen in the conventional manner by repeated flushing with nitrogen. The liquor is saturated with TFE by twice injecting TFE to an excess pressure of 1.6 bar. The medium is heated to 75° C., and TFE is injected to a pressure of 9 bar with stirring. 560 g of vinyl acetate and 1180 g of the highly branched vinyl ester from Example 1 are added, and the polymerization pressure is adjusted to 10 bar by further injection of TFE. Polymerization is initiated by adding 18 g of bis(4-tert.-butylcyclohexyl) peroxydicarbonate, which is previously dissolved in xylene. Further bis(4-tert.-butylcyclohexyl) peroxydicarbonate is added during the polymerization in an amount precisely sufficient to keep the polymerization rate constant. The pressure in the reactor is kept at 10 bar by subsequent addition of TFE, and further monomers, vinyl acetate and the highly branched vinyl ester are added in accordance with the consumption of TFE. The subsequent addition is carried out continuously and is complete after 4 hours. In total, 1500 g of TFE, 2360 g of the highly branched vinyl ester from Example 1 and 1120 g of vinyl acetate are added. The total consumption of initiator is 300 g.

The polymerization is complete three-quarters of an hour after completion of the addition of monomer and initiator, after the pressure in the polymerization reactor has dropped to 9.2 bar, giving a clear copolymer solution having a solids content of 17%. The residual monomer content is 2.7% of highly branched vinyl ester and 1.9% of vinyl acetate. In order to remove the polymerization liquor and residual monomers, the product solution is distilled. The polymer obtained in this way is colorless to slightly yellowish and contains 37 mol-% of TFE units, 31 mol-% of copolymerized units of the highly branched vinyl ester from Example 1 and 32 mol-% of copolymerized units of vinyl acetate. After hydrolysis, which is carried out as in Example 1, it has an OH number of 105 (degree of hydrolysis 64%), an intrinsic viscosity $\eta$, measured at 25° C. in tetrahydrofuran, of 0.023 dl/g and a molecular weight $\overline{M}_{rel}$, determined by gel permeation chromatography (GPC) in tetrahydrofuran relative to a polystyrene standard, of 3,360.

The product is readily soluble in butyl acetate, xylene, in a 2:1 xylene/methyl isobutyl ketone mixture, in propylene glycol monomethyl ether and in propylene glycol acetate monomethyl ether. The viscosity determination of the 50% strength by weight solutions was carried out, as customary in surface coatings, in accordance with DIN 53 211 using a 4 mm flow cup and gave values between 6 and 39 seconds, depending on the solvent and the temperature.

In the examples below, the following test methods and tests were used:

Dust dry corresponds to degree of dryness 1 in accordance with DIN standard 53 150 "Determination of the dryness of paints".

Tack dry corresponds to degree of dryness 2 in accordance with DIN standard 53 150.

| | |
|---|---|
| König pendulum hardness: | DIN standard 53 157 |
| Erichsen cupping: | ISO procedure 1520 |
| Impact: | ECCA (European Coil-Coater's Asociation) T 5, corresponds to reference standards ASTM D 2794 - 69 and ISO R 291 |
| Pencil hardness: | ECCA T 4 |

Flexural test (T-bend):

The coating is applied to aluminum sheeting (Bonder Al 722). Film thickness wet 100 μm, corresponds to from 20 to 22 μm dry. A 1 cm broad strip of this sheeting is folded with the film on the outside and bent through 180°. This operation is then repeated (with increasing flexural radius) on the same strips until the film no longer cracks (T 0=does not crack in the first flexing operation, T 1=does not crack in the second flexing operation, and so on).

EXAMPLE 14

| | |
|---|---|
| Blending in a pearl mill: | |
| Copolymer from Example 2 (50% strength by weight solution in butyl acetate) | 200.00 g |
| Titanium dioxide | 122.00 g |
| | 322.00 g |
| Coating batch: | |
| Pearl mill batch as above | 322.00 g |
| Hexamethylene diisocyanate trimer, 75% strength by weight solution (® Desmodur N 75) | 52.20 g |
| Dibutyltin dilaurate (1% strength by weight solution in xylene) | 200.00 mg |

The surface coating is cured at 20° C. The mixture is applied to a glass plate using an applicator. The coating is subjected to various tests. The results are shown in Table 2.

TABLE 2

| Test | Result |
|---|---|
| Dust dry | 30 min |
| Tack dry | 60 min |
| Pendulum hardness, 7 days | 158 s |
| Erichsen cupping, 14 days | 11 mm |
| Sun test* 0 h | 92% |
| 250 h | 88% |
| 500 h | 83% |
| 750 h | 80% |
| 1000 h | 79% |

*Determination of the gloss of the surface at 60° Mirror reflection in accordance with DIN standard 67 530 (% reflected light intensity, based on 100% incident light intensity)

EXAMPLE 15

| | |
|---|---|
| Copolymer from Example 2 (50% strength by weight solution in butyl acetate) | 100.00 g |
| Pentamethyl-etherified methylolmelamine (® Maprenal MF 900) | 5.55 g |
| p-Toluenesulfonic acid | 26.00 mg |

Film application:

Clear coatings, knife application 100 μm wet, from about 20 to 22 μm dry.

PMT (Peak metal temperature): 224° to 232° C.

The mixture is applied to aluminum sheeting (Bonder Al 722). The coating obtained is subjected to various tests. The results are shown in Table 3.

TABLE 3

| Test | Result |
|---|---|
| Acetone test*) | >100 |
| Impact | 40 ip |
| T-bend | T 2 |
| Adhesion after T-bend**) | 0 |

TABLE 3-continued

| Test | Result |
|---|---|
| Pencil hardness | F |

*)Number of wiping operations (double wipes) using acetone-soaked gauze before the coating rubs off.
**)Scale 0 to 5; 0 = best value, visual assessment of adhesion and the resultant T-bend crack

EXAMPLE 16

| | |
|---|---|
| Copolymer from Example 2 (50% strength by weight solution in butyl acetate) | 100.00 g |
| Block aliphatic isocyanate 25% strength by weight solution in methoxypropyl acetate (®Additol VXL 9946) | 121.70 g |

Film application:
The mixture is applied to aluminum sheeting (Bonder Al 722) as a clear coat.
Knife application 100 μm wet, from about 20 to 22 μm dry.
PMT (peak metal temperature): 224° to 232° C.
The coating is subjected to various tests. The results are shown in Table 4.

TABLE 4

| Test | Result |
|---|---|
| Acetone test | >100 |
| Impact | 40 ip |
| T-bend | T 2 |
| Adhesion after T-bend | 0 |
| Pencil hardness | H |

EXAMPLE 17

| | |
|---|---|
| Copolymer from Example 7 (50% strength by weight solution in xylene/methyl isobutyl ketone 1:2) | 100.00 g |
| Pentamethyl-etherified methylolalamine (®Maprenal MF 900) | 5.55 g |
| p-Toluenesulfonic acid | 62.50 mg |

Film application:
Clear coats, knife application 100 μm wet, from 20 to 22 μm dry.
Baking conditions: 190° C., 15 minutes.
The coating is subjected to various tests. The results are shown in Table 5.

TABLE 5

| Test | Result |
|---|---|
| Acetone test | >100 |
| Impact | 80 ip |
| T-bend | T 3 |
| Adhesion after T-bend | 0 |
| Pencil hardness | F |

EXAMPLE 18

Use of UV absorbers in combination with cold-curing fluorinated coating binders:

| | |
|---|---|
| Copolymer from Example 2 (50% strength by weight solution in butyl acetate) | 100.00 g |
| Dibutyltin dilaurate | 100.00 mg |
| (1% strength by weight solution in xylene) | |
| Sterically hindered piperidine derivative (®Tinuvin 292 from Ciba-Geigy) | 0.61 g |
| 2-[Hydroxy-3,5-di(1,1-dimethylbenzyl)-phenyl]-2H-benzotriazole, 10% strength by weight solution in xylene (UV absorber) | 6.10 g |
| Hexamethylene diisocyanate trimer, 75% strength by weight solution (®Desmodur N 75) | 26.10 g |

Application:
Spraying: 2 cross sprays = from about 25 to 30 μm dry.
The curing is carried out at room temperature. The coating is subjected to various tests. The results are shown in Table 6.

TABLE 6

| Test | Result |
|---|---|
| Dust dry | 30 min |
| Tack dry | 60 min |
| Pendulum hardness 7 days | 143 s |
| Haze* | 1 |

*Scale 0 to 5; 0 = best value.

We claim:
1. A crosslinkable, fluorine-containing copolymer which comprises
   a) from 10 to 60 mol-% of copolymerized units of a vinyl ester of the formula

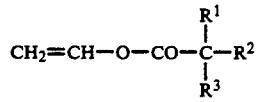

in which $R^1$, $R^2$ and $R^3$ are alkyl radicals and in which the entire acyl radical contains 9 carbon atoms and comprises at least one isomer which contains two quaternary carbon atoms in admixture with 0 to 80 mol-% of isomer containing one quaternary carbon atom together with at least one tertiary carbon atom,
   b) from 20 to 50 mol-% of copolymerized units of a vinyl ester of the formula

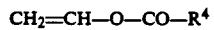

in which $R^4$ is an unsubstituted straight-chain alkyl radical having 1 to 3 carbon atoms and in which from 50 to 100% of the copolymerized units of this vinyl ester b) are in the OH form obtained by hydrolysis, and
   c) copolymerized units of a perfluoroolefin of the formula

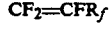

in which $R_f$ is F or a perfluoroalkyl radical having 1 to 8 carbon atoms, in an amount which makes the sum of components a)+b)+c) up to 100 mol-%, but with the proviso that at least 10 mol-% of the perfluoroolefin are present in the copolymer.

2. A crosslinkable, fluorine-containing copolymer as claimed in claim 1, which comprises
   a) from 15 to 60 mol-% of copolymerized units of a vinyl ester of the formula

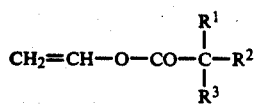

in which $R^1$, $R^2$ $R^3$ are alkyl radicals and in which the entire acyl radical contains 9 carbon atoms and comprises at least one isomer which contains two quaternary carbon atoms in admixture with 0 to 80 mol-% of isomer containing one quaternary carbon atom together with at least one tertiary carbon atom, b) from 15 to 45 mol-% of copolymerized units of a vinyl ester of the formula $$CH_2=CH-O-CO-R^4$$

in which $R^4$ is an unsubstituted straight-chain alkyl radical having 1 to 3 carbon atoms and in which from 50 to 100% of the copolymerized units of this vinyl ester b) are in the OH form obtained by hydrolysis, and c) copolymerized units of a perfluoroolefin of the formula $$CF_2=CFR_f$$

in which $R_f$ is F or a perfluoroalkyl radical having 1 to 8 carbon atoms, in an amount which makes the sum of components a)+b)+c) up to 100 mol-%, but with the proviso that at least 20 mol-% of the perfluoroolefin are present in the copolymer.

3. A crosslinkable, fluorine-containing copolymer as claimed in claim 1, wherein component a) comprises copolymerized units of a vinyl ester of the formula

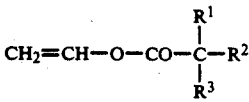

in which $R^1$, $R^2$ and $R^3$ are alkyl radicals and in which the entire acyl radical has 9 carbon atoms and comprises at least one isomer which contains two quaternary carbon atoms in admixture with 0.5 to 80 mol-% of an isomer containing one quaternary carbon atom together with two tertiary carbon atoms.

4. A crosslinkable, fluorine-containing copolymer as claimed in claim 1, wherein component a) comprises copolymerized units of a vinyl ester of the formula

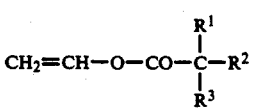

in which $R^1$, $R^2$ and $R^3$ are alkyl radicals and in which the entire, acyl radical has 9 carbon atoms and comprises at least one isomer which contains two quaternary carbon atoms in admixture with 0.5 to 20 mol-% of an isomer containing one quaternary carbon atom together with one tertiary carbon atom.

5. A crosslinkable, fluorine-containing copolymer as claimed in claim 1, wherein the perfluoroolefin of component c) is tetrafluoroethylene.

6. A surface coating composition for industrial applications, containing pigments and fillers, crosslinking components, solvents and assistants for surface coatings, and containing from 10 to 50% by weight of a copolymer as claimed in claim 1.

7. A crosslinkable, fluorine-containing copolymer as claimed in claim 1, wherein said component (a) consists essentially of a copolymerized unit of said formula in which at least one of the radicals $R^1$, $R^2$, and $R^3$ contains a quaternary carbon atom, so that said entire acyl radical contains one further quaternary carbon atom in addition to the quaternary carbon atom attached to the carbonyl group of said formula.

* * * * *